United States Patent
Hyung et al.

(10) Patent No.: US 9,291,743 B2
(45) Date of Patent: Mar. 22, 2016

(54) PHOTOSENSITIVE RESIN COMPOSITION AND COLOR FILTER USING THE SAME

(71) Applicant: Samsung SDI Co., Ltd., Yongin-si (KR)

(72) Inventors: Kyung-Hee Hyung, Suwon-si (KR); Nam-Gwang Kim, Suwon-si (KR); Yeon-Soo Lee, Suwon-si (KR); Yu-Jin Lee, Suwon-si (KR); In-Jae Lee, Suwon-si (KR); Chang-Ryul Lee, Suwon-si (KR); Ji-Young Jeong, Suwon-si (KR); Se-Young Choi, Suwon-si (KR); Seung-Jib Choi, Suwon-si (KR); Ji-Hyun Hwang, Suwon-si (KR)

(73) Assignee: SAMSUNG SDI CO., LTD., Yongin-Si (KR)

( * ) Notice: Subject to any disclaimer, the term of this patent is extended or adjusted under 35 U.S.C. 154(b) by 5 days.

(21) Appl. No.: 14/479,584

(22) Filed: Sep. 8, 2014

(65) Prior Publication Data

US 2015/0198741 A1    Jul. 16, 2015

(30) Foreign Application Priority Data

Jan. 14, 2014  (KR) .................. 10-2014-0004640
Aug. 12, 2014  (KR) .................. 10-2014-0104456

(51) Int. Cl.
| | | |
|---|---|---|
| G02B 5/23 | (2006.01) | |
| G02B 1/04 | (2006.01) | |
| G02F 1/1335 | (2006.01) | |
| C08G 77/04 | (2006.01) | |

(52) U.S. Cl.
CPC ... *G02B 1/04* (2013.01); *G02B 5/23* (2013.01)

(58) Field of Classification Search
USPC ....... 252/582, 586; 349/106; 359/885; 430/7, 430/270.1, 281.1, 321
See application file for complete search history.

(56) References Cited

U.S. PATENT DOCUMENTS

| | | | |
|---|---|---|---|
| 5,346,545 | A | 9/1994 | Chassot |
| 5,998,091 | A | 12/1999 | Suzuki |
| 6,221,574 | B1 | 4/2001 | Missfeldt |
| 6,280,921 | B1 | 8/2001 | Michael et al. |
| 7,081,160 | B2 | 7/2006 | Hamada |
| 8,172,934 | B2 | 5/2012 | Hashizume |

FOREIGN PATENT DOCUMENTS

| | | |
|---|---|---|
| JP | 06-041458 A | 2/1994 |
| JP | 07-140654 A | 6/1995 |
| JP | 10-254133 A | 9/1998 |
| JP | 2000-129151 A | 5/2000 |
| JP | 2000-239547 A | 9/2000 |
| JP | 2010-168531 A | 8/2010 |
| JP | 4993026 B1 | 8/2012 |
| JP | 2012-208474 A | 10/2012 |
| JP | 2012-212054 A | 11/2012 |
| JP | 2012-236882 A | 12/2012 |
| JP | 2013-068935 A | 4/2013 |
| JP | 2013-080204 A | 5/2013 |
| KR | 10-2006-0049752 A | 5/2006 |
| KR | 10-2010-0080141 A | 7/2010 |
| KR | 10-2011-0072947 A | 6/2011 |
| TW | 201144388 A1 | 12/2011 |
| TW | 201339760 A | 10/2013 |

*Primary Examiner* — Bijan Ahvazi
(74) *Attorney, Agent, or Firm* — Additon, Higgins & Pendleton, P.A.

(57) ABSTRACT

Disclosed are a photosensitive resin composition including (A) a colorant including a compound represented by the following Chemical Formula 1 and Chemical Formula 2, wherein in Formulae 1 and 2, each substituent is the same as defined in the detailed description; (B) an acrylic-based binder resin; (C) a photopolymerizable monomer; (D) a photopolymerization initiator; and (E) a solvent, and a color filter using the same.

[Chemical Formula 1]

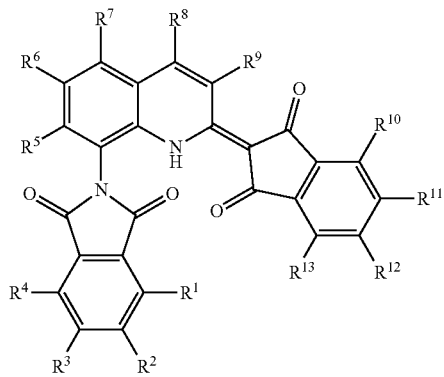

[Chemical Formula 2]

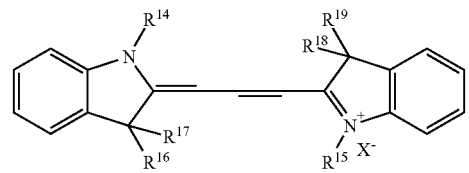

8 Claims, No Drawings

PHOTOSENSITIVE RESIN COMPOSITION AND COLOR FILTER USING THE SAME

CROSS-REFERENCE TO RELATED APPLICATION

This application claims priority to and the benefit of Korean Patent Application No. 10-2014-0004640 filed in the Korean Intellectual Property Office on Jan. 14, 2014, and Korean Patent Application No. 10-2014-0104456 filed in the Korean Intellectual Property Office on Aug. 12, 2014, the entire disclosure of which are incorporated herein by reference.

FIELD OF THE INVENTION

This disclosure relates to a photosensitive resin composition for a color filter and a color filter using the same.

BACKGROUND

Color filters are used for liquid crystal displays (LCDs), optical filters for cameras, and the like. Color filters may be manufactured by coating a fine region colored with three or more colors on a charge coupled device or a transparent substrate. This colored thin film can be manufactured using a pigment dispersion method, and the like.

A color photosensitive resin composition used for manufacturing a color filter by the pigment dispersion method generally includes a binder resin, a photopolymerizable monomer, a photopolymerization initiator, a pigment, a solvent, other additives, and the like. As for the colorant, a pigment dispersion is mostly used. For example, a red pigment dispersion obtained by mixing a red pigment and a yellow pigment can be used to realize red pixels of a color filter, and a green pigment dispersion obtained by mixing a green pigment and the yellow pigment can be used to realize green pixels of the color filter.

Recently, color filters have been produced through a continuous process capable of mass production. In addition, there is increased demand that color filters exhibit excellent color characteristics, heat resistance, and the like to meet high quality specifications. Accordingly, there is a need to enhance the colorant to improve luminance and contrast ratio characteristics.

SUMMARY

One embodiment provides a photosensitive resin composition that can have excellent color characteristics due to improved transmittance and high luminance and a high contrast ratio.

Another embodiment provides a color filter manufactured using the photosensitive resin composition.

One embodiment provides a photosensitive resin composition including (A) a colorant including a compound represented by the following Chemical Formula 1 and Chemical Formula 2; (B) an acrylic-based binder resin; (C) a photopolymerizable monomer; (D) a photopolymerization initiator; and (E) a solvent.

[Chemical Formula 1]

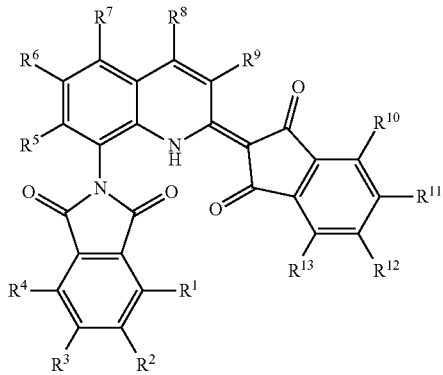

[Chemical Formula 2]

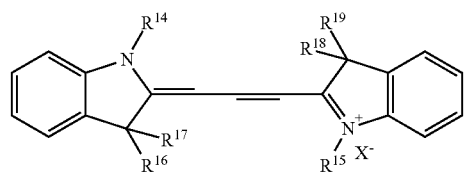

In the above Chemical Formula 1,
$R^1$ to $R^{13}$ are the same or different and are each independently hydrogen, halogen, substituted or unsubstituted C1 to C10 alkyl, a sulfonic acid group, or an aliphatic organic group including a carboxyl group, with the proviso that at least one or more of $R^{10}$ to $R^{13}$ is an aliphatic organic group including a carboxyl group.

In the above Chemical Formula 2,
$R^{14}$ to $R^{19}$ are the same or different and are each independently hydrogen, halogen, substituted or unsubstituted C1 to C10 alkyl, a sulfonic acid group, or an aliphatic organic group including a carboxyl group, with the proviso that at least one or more of $R^{14}$ and $R^{15}$ is an aliphatic organic group including a carboxyl group, and $X^-$ is $CF_3SO_3^-$, $Cl^-$, $C_6F_5B^-$ or $C_6H_5SO_3^-$.

In the above Chemical Formula 1, two of $R^1$ to $R^4$ may be a halogen and the remaining two may be a sulfonic acid group, $R^5$ to $R^9$ may be hydrogen, and one of $R^{10}$ to $R^{13}$ may be an aliphatic organic group including a carboxyl group, and the remaining three may be a halogen.

In the above Chemical Formula 2, $R^{14}$ to $R^{15}$ may be an aliphatic organic group including a carboxyl group, and $R^{16}$ to $R^{19}$ may be substituted or unsubstituted C1 to C10 alkyl.

The aliphatic organic group including a carboxyl group may be represented by the following Chemical Formula 3.

[Chemical Formula 3]

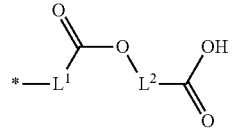

In the above Chemical Formula 3,
$L^1$ and $L^2$ are the same or different and are each independently a single bond or substituted or unsubstituted C1 to C10 alkylene.

The colorant may include a compound represented by the above Chemical Formula 1 and a compound represented by the above Chemical Formula 2 in a weight ratio of about 1:5 to about 1:10.

The photopolymerizable monomer may include ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy (meth)acrylate, ethylene glycol monomethylether(meth)acrylate, trimethylol propane tri(meth)acrylate, tris(meth)acryloyloxyethyl phosphate, novolacepoxy(meth)acrylate, or a combination thereof.

The photosensitive resin composition may include about 1 wt % to about 10 wt % of the colorant (A); about 1 wt % to about 10 wt % of the acrylic-based binder resin (B); about 3 wt % to about 13 wt % of the photopolymerizable monomer (C); about 0.1 wt % to about 3 wt % of the photopolymerization initiator (D), and a balance amount of the solvent (E).

The photosensitive resin composition may further include at least one additive selected from malonic acid; 3-amino-1,2-propanediol; a silane-based coupling agent having a vinyl group or a (meth)acryloxy group; a leveling agent; a fluorine-based surfactant; and/or a radical polymerization initiator.

Another embodiment provides a color filter using the photosensitive resin composition for a color filter.

Other embodiments are included in the following detailed description.

The photosensitive resin composition can have excellent transmittance, and high luminance and a high contrast ratio, and thus excellent color characteristics, and thus may be used in a color filter.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to substitution with one or more substituents including halogen (F, Cl, Br, I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof, instead of at least one hydrogen.

As used herein, when a specific definition is not otherwise provided, the term "hetero" may refer to one substituted with at least one or more hetero atoms including N, O, S and/or P, instead of at least one C in a cyclic substituent.

As used herein, when a specific definition is not otherwise provided, "(meth)acrylate" refers to both "acrylate" and "methacrylate", and "(meth)acrylic acid" refers to both "acrylic acid" and "methacrylic acid".

As used herein, when a specific definition is not otherwise provided, the term "combination" refers to mixing or copolymerization.

As used herein, unless a specific definition is otherwise provided, a hydrogen atom is bonded at a position when a chemical bond is not drawn where a bond would otherwise appear.

As used herein, when a specific definition is not otherwise provided, "*" indicates a point where the same or different atom or chemical formula is linked.

A photosensitive resin composition according to one embodiment includes (A) a colorant including a compound represented by the following Chemical Formula 1 and Chemical Formula 2; (B) an acrylic-based binder resin; (C) a photopolymerizable monomer; (D) a photopolymerization initiator; and (E) a solvent.

The photosensitive resin composition according to one embodiment includes compounds represented by the following Chemical Formulae 1 and 2 and enhances solubility and dispersion of the colorant and thus, may improve color characteristics such as transmittance, luminance, and the like.

[Chemical Formula 1]

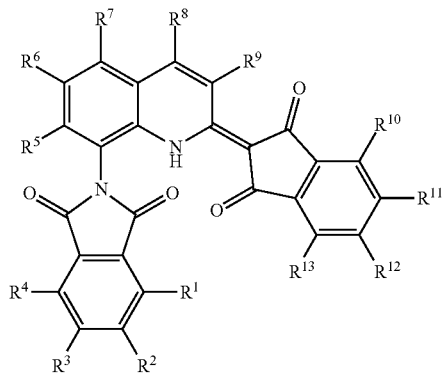

[Chemical Formula 2]

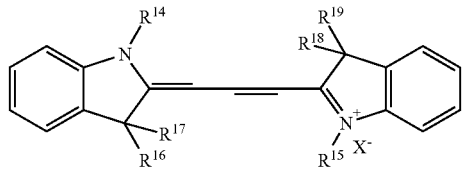

In the above Chemical Formula 1, $R^1$ to $R^{13}$ are the same or different and are each independently hydrogen, halogen, substituted or unsubstituted C1 to C10 alkyl, a sulfonic acid group or an aliphatic organic group including a carboxyl group, with the proviso that at least one or more of $R^{10}$ to $R^{13}$ is an aliphatic organic group including a carboxyl group.

In the above Chemical Formula 2, $R^{14}$ to $R^{19}$ are the same or different and are each independently hydrogen, halogen, substituted or unsubstituted C1 to C10 alkyl, a sulfonic acid group or an aliphatic organic group including a carboxyl group, with the proviso that at least one or more of $R^{14}$ and $R^{15}$ is an aliphatic organic group including a carboxyl group, and $X^-$ is $CF_3SO_3^-$, $Cl^-$, $C_6F_5B^-$ or $C_6H_5SO_3^-$.

For example, in the above Chemical Formula 1, two of $R^1$ to $R^4$ may be a halogen and the remaining two may be a sulfonic acid group, $R^5$ to $R^9$ may be hydrogen, and one of $R^{10}$ to $R^{13}$ may be an aliphatic organic group including a carboxyl group, and the remaining three may be a halogen, and in the above Chemical Formula 2, $R^{14}$ to $R^{15}$ may be an aliphatic organic group including a carboxyl group, and $R^{16}$ to $R^{19}$ may be substituted or unsubstituted C1 to C10 alkyl.

Hereinafter, each component is described in detail.

(A) Colorant

The photosensitive resin composition according to one embodiment includes a colorant including compounds represented by the above Chemical Formulae 1 and 2.

The compound represented by the above Chemical Formula 1 has a similar structure to that of a yellow pigment Y138 but better coloring strength than that of the yellow pigment Y138 and thus can have excellent color characteristics such as luminance and the like and well realizes a color. The compound represented by the above Chemical Formula 1, however, generally has lower solubility than that of a dye and thus, there can be a problem of deteriorating dissolubility when only the compound represented by the above Chemical Formula 1 is used as a colorant. In addition, the compound represented by the above Chemical Formula 1 becomes anionic, since a proton (hydrogen) having acidity such as a carboxyl group and the like is easily removed by a base and the like.

On the other hand, the compound represented by Chemical Formula 2 as a cyanine-based red dye may improve durability of a dye, and thus reliability, through an acid-base ion adsorption reaction with the anionic compound.

The compound represented by the above Chemical Formula 1 can easily becomes anionic and thus may perform ion exchanges with $X^-$ of the compound represented by Chemical Formula 2. As a result, the compound represented by Chemical Formula 2 forms an ionic bond with the compound represented by Chemical Formula 1 and thus may complement low solubility of the compound represented by Chemical Formula 1 and improve dissolubility.

In addition, the compound represented by Chemical Formula 1 shows high transmittance characteristics and thus may complement durability of the compound represented by Chemical Formula 2 and improve reliability.

In an exemplary embodiment, the aliphatic organic group including a carboxyl group may be represented by the following Chemical Formula 3.

[Chemical Formula 3]

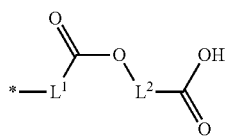

In the above Chemical Formula 3, $L^1$ and $L^2$ are the same or different and are each independently, a single bond or substituted or unsubstituted C1 to C10 alkylene.

In exemplary embodiments, the colorant can have the substituent represented by Chemical Formula 3 and may improve solubility, and particularly, may have an effect on improving solubility and durability through an ionic bond with a cationic material or adsorption.

The colorant may include the compound represented by Chemical Formula 1 and the compound represented by Chemical Formula 2 in a weight ratio of about 1:5 to about 1:10. When the compounds represented by Chemical Formulae 1 and 2 are included in a weight ratio within the above range, solubility and durability may be improved.

A dispersing agent may be additionally added to the photosensitive resin composition to disperse the compounds represented by the above Chemical Formulae 1 and 2.

The dispersing agent may be a non-ionic dispersing agent, an anionic dispersing agent, and/or a cationic dispersing agent, and the like. Examples of the dispersing agent may include without limitation polyalkylene glycols and esters thereof, polyoxyalkylenes, polyhydric alcohol ester alkylene oxide addition products, alcohol alkylene oxide addition products, sulfonate esters, sulfonate salts, carboxylate esters, carboxylate salts, alkylamide alkylene oxide addition products, alkyl amines, and the like. These may be used singularly or as a mixture of two or more.

Commercially available examples of the dispersing agent may include without limitation DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, DISPERBYK-2001, and the like made by BYK Co., Ltd.; EFKA-47, EFKA-47EA, EFKA-48, EFKA-49, EFKA-100, EFKA-400, EFKA-450, and the like made by EFKA Chemicals Co.; Solsperse 5000, Solsperse 12000, Solsperse 13240, Solsperse 13940, Solsperse 17000, Solsperse 20000, Solsperse 24000GR, Solsperse 27000, Solsperse 28000, and the like made by Zeneka Co.; PB711, PB821, and the like made by Ajinomoto Inc.; and the like, and combinations thereof.

The dispersing agent may be included in an amount of about 0.01 wt % to about 15 wt % based on the total amount (total weight, 100 wt %) of the photosensitive resin composition. When the dispersing agent is included in an amount within the above range, the photosensitive resin composition can have excellent stability, developability, and pattern-forming capability due to improved dispersion properties.

Herein, the pigment may be included in a form of dispersion in the photosensitive resin composition. Examples of a solvent that can be used to prepare the pigment dispersion may include without limitation ethylene glycol acetate, ethylcellosolve, propylene glycol methyletheracetate, ethyllactate, polyethylene glycol, cyclohexanone, propylene glycol methylether, and the like, and combinations thereof.

The photosensitive resin composition may include the colorant including the compounds represented by the above Chemical Formula 1 and Chemical Formula 2 in an amount of about 1 wt % to about 10 wt %, for example about 3 wt % to about 8 wt %, based on the total amount (total weight, 100 wt %) of the photosensitive resin composition. In some embodiments, the photosensitive resin composition may include the colorant in an amount of about 1, 2, 3, 4, 5, 6, 7, 8, 9, or 10 wt %. Further, according to some embodiments of the present invention, the amount of the colorant can be in a range from about any of the foregoing amounts to about any other of the foregoing amounts.

When the colorant is included in an amount within the above range, color characteristics may be improved and high luminance and contrast ratio may be realized at the same color coordinates.

(B) Acrylic-Based Binder Resin

A photosensitive resin composition according to one embodiment includes an acrylic-based binder resin.

The acrylic-based binder resin is a copolymer of a first ethylenic unsaturated monomer and a second ethylenic unsaturated monomer that is copolymerizable therewith, and is a resin including at least one acrylic-based repeating unit.

The first ethylenic unsaturated monomer is an ethylenic unsaturated monomer including at least one carboxyl group. Examples of the first ethylenic unsaturated monomer may include without limitation acrylic acid, methacrylic acid, maleic acid, itaconic acid, fumaric acid, and the like, and combinations thereof.

The first ethylenic unsaturated monomer may be included in an amount of about 5 wt % to about 50 wt %, for example about 10 wt % to about 40 wt %, based on the total amount (total weight, 100 wt %) of the acrylic-based binder resin.

Examples of the second ethylenic unsaturated monomer may include without limitation aromatic vinyl compounds such as styrene, α-methylstyrene, vinyl toluene, vinylbenzylmethylether and the like; unsaturated carboxylate ester compounds such as methyl(meth)acrylate, ethyl(meth)acrylate, butyl(meth)acrylate, 2-hydroxyethyl(meth)acrylate, 2-hydroxybutyl(meth)acrylate, benzyl(meth)acrylate, cyclohexyl (meth)acrylate, phenyl(meth)acrylate, and the like; unsaturated carboxylic acid amino alkyl ester compounds such as 2-aminoethyl(meth)acrylate, 2-dimethylaminoethyl(meth) acrylate, and the like; carboxylic acid vinyl ester compounds such as vinyl acetate, vinyl benzoate, and the like; unsaturated carboxylic acid glycidyl ester compounds such as glycidyl (meth)acrylate, and the like; vinyl cyanide compounds such as (meth)acrylonitrile and the like; unsaturated amide compounds such as (meth)acrylamide, and the like; and the like. These may be used singularly or as a mixture of two or more.

Examples of the acrylic-based binder resin may include without limitation polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzyl methacrylate/styrene/2-hydroxyethylmethacrylate copolymer, and the like. These may be used singularly or as a mixture of two or more.

The acrylic-based binder resin may have a weight average molecular weight of about 3,000 g/mol to about 150,000 g/mol, for example about 5,000 g/mol to about 50,000 g/mol. When the acrylic-based binder resin has a weight average molecular weight within the above range, the photosensitive resin composition for a color filter may have excellent physical and chemical properties and an appropriate viscosity, maintain appropriate developability and sensitivity, and show excellent close-contacting properties to a substrate during manufacture of a color filter.

The acrylic-based binder resin may have an acid value of about 50 mgKOH/g to about 150 mgKOH/g, for example about 70 mgKOH/g to about 130 mgKOH/g. When the acrylic-based binder resin has an acid value within the above range, a pixel may have excellent resolution.

The photosensitive resin composition may include the acrylic-based binder resin in an amount of about 1 wt % to about 10 wt %, for example about 4 wt % to about 8 wt %, based on the total amount (total weight, 100 wt %) of the photosensitive resin composition for a color filter. In some embodiments, the photosensitive resin composition may include the acrylic-based binder resin in an amount of about 1, 2, 3, 4, 5, 6, 7, 8, 9, or 10 wt %. Further, according to some embodiments of the present invention, the amount of the acrylic-based binder resin can be in a range from about any of the foregoing amounts to about any other of the foregoing amounts.

When the acrylic-based binder resin is included in an amount within the above range, sensitivity and developability can be improved, and there may be minimal or no stripped pattern due to improved chemical resistance.

(C) Photopolymerizable Monomer

The photopolymerizable monomer may be a mono-functional and/or multi-functional ester of (meth)acrylic acid including at least one ethylenic unsaturated double bond.

The photopolymerizable monomer has the ethylenic unsaturated double bond and thus may cause sufficient polymerization during exposure in a pattern-forming process and form a pattern having excellent heat resistance, light resistance, and chemical resistance.

Examples of the photopolymerizable monomer may include without limitation ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth) acrylate, pentaerythritol di(meth)acrylate, pentaerythritol tri (meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether(meth)acrylate, trimethylol propane tri (meth)acrylate, tris(meth)acryloyloxyethyl phosphate, novolacepoxy(meth)acrylate, and the like, and combinations thereof.

Commercially available examples of the reactive unsaturated compound include the following. The mono-functional (meth)acrylic acid ester may include without limitation Aronix M-101®, M-111®, and/or M-114® (Toagosei Chemistry Industry Co., Ltd.); KAYARAD TC-110S® and/or TC-120S® (Nippon Kayaku Co., Ltd.); V-158® and/or V-2311° (Osaka Organic Chemical Ind., Ltd.), and the like. Examples of a difunctional (meth)acrylic acid ester may include without limitation Aronix M-210®, M-240®, and/or M-6200® (Toagosei Chemistry Industry Co., Ltd.), KAYARAD HDDA®, HX-220®, and/or R-604® (Nippon Kayaku Co., Ltd.), V-260®, V-312®, and/or V-335 HP® (Osaka Organic Chemical Ind., Ltd.), and the like. Examples of a tri-functional (meth)acrylic acid ester may include without limitation Aronix M-309®, M-400®, M-405®, M-450®, M-7100®, M-8030®, and/or M-8060® (Toagosei Chemistry Industry Co., Ltd.), KAYARAD TMPTA®, DPCA-20®, DPCA-30®, DPCA-60®, and/or DPCA-120® (Nippon Kayaku Co., Ltd.), V-295®, V-300®, V-360®, V-GPT®, V-3PA®, and/or V-400® (Osaka Yuki Kayaku Kogyo Co. Ltd.), and the like. These may be used singularly or as a mixture of two or more.

The photopolymerizable monomer may be treated with acid anhydride to improve developability.

The photosensitive resin composition may include the photopolymerizable monomer in an amount of about 3 wt % to about 13 wt %, for example about 4 wt % to about 11 wt %, based on the total amount (total weight, 100 wt %) of the photosensitive resin composition for a color filter. In some embodiments, the photosensitive resin composition may include the photopolymerizable monomer in an amount of about 3, 4, 5, 6, 7, 8, 9, 10, 11, 12, or 13 wt %. Further, according to some embodiments of the present invention, the amount of the photopolymerizable monomer can be in a range from about any of the foregoing amounts to about any other of the foregoing amounts.

When the photopolymerizable monomer is included in an amount within the above range, the photopolymerizable monomer can be sufficiently cured during exposure in a pattern-forming process and can have excellent reliability, and developability for alkali developing solution may be improved.

(D) Photopolymerization Initiator

Examples of the photopolymerization initiator may include without limitation acetophenone-based compounds, benzophenone-based compounds, thioxanthone-based compounds, benzoin-based compounds, triazine-based compounds, oxime-based compounds, and the like, and combinations thereof.

Examples of the acetophenone-based compound may include without limitation 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like, and combinations thereof.

Examples of the benzophenone-based compound may include without limitation benzophenone, benzoyl benzoate, benzoyl benzoate methyl ester, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like, and combinations thereof.

Examples of the thioxanthone-based compound may include without limitation thioxanthone, 2-chlorothioxanthone, 2-methylthioxanthone, isopropyl thioxanthone, 2,4-diethyl thioxanthone, 2,4-diisopropyl thioxanthone, and the like, and combinations thereof.

Examples of the benzoin-based compound may include without limitation benzoin, benzoin methyl ether, benzoin ethyl ether, benzoin isopropyl ether, benzoin isobutyl ether, benzyldimethylketal, and the like, and combinations thereof.

Examples of the triazine-based compound may include without limitation 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl-4,6-bis(trichloro methyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like, and combinations thereof.

Examples of the oxime-based compound may include without limitation 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, and the like, and combinations thereof.

The photopolymerization initiator may further include one or more of a carbazole-based compound, a diketone-based compound, a sulfonium borate-based compound, a diazo-based compound, an imidazole-based compound, a biimidazole-based compound, and the like instead of or in addition to one of the above compounds.

The photosensitive resin composition may include the photopolymerization initiator in an amount of about 0.1 wt % to about 3 wt %, for example about 0.2 wt % to about 2 wt %, based on the total amount (total weight, 100 wt %) of the photosensitive resin composition for a color filter. In some embodiments, the photosensitive resin composition may include the photopolymerization initiator in an amount of about 0.1, 0.2, 0.3, 0.4, 0.5, 0.6, 0.7, 0.8, 0.9, 1, 2, or 3 wt %. Further, according to some embodiments of the present invention, the amount of the photopolymerization initiator can be in a range from about any of the foregoing amounts to about any other of the foregoing amounts.

When the photopolymerization initiator is included in an amount within the above range, sufficient photopolymerization can occur during exposure in a pattern-forming process, and transmittance may be prevented from deterioration due to a non-reaction initiator.

(E) Solvent

The solvent is a material having compatibility with the acrylic-based binder resin, the photopolymerizable monomer, the photopolymerization initiator, and the colorant but not reacting therewith.

The solvent is not particularly limited. Examples of the solvent may include without limitation alcohols such as methanol, ethanol and the like; ethers such as dichloroethyl ether, n-butyl ether, diisoamyl ether, methylphenyl ether, tetrahydrofuran, and the like; glycol ethers such ethylene glycol methylether, ethylene glycol ethylether, propylene glycol methylether and the like; cellosolve acetates such as methyl cellosolve acetate, ethyl cellosolve acetate, diethyl cellosolve acetate, and the like; carbitols such methylethyl carbitol, diethyl carbitol, diethylene glycol monomethylether, diethylene glycol monoethylether, diethylene glycol dimethylether, diethylene glycol methylethylether, diethylene glycol diethylether, and the like; alkyl acetates such n-butyl acetate, n-pentyl acetate, n-hexyl acetate, isobutyl acetate, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; alkyl lactate esters such as methyl lactate, ethyl lactate, and the like; hydroxyacetic acid alkyl esters such as methyl hydroxyacetate, ethyl hydroxyacetate, butyl hydroxyacetate, and the like; alkoxyalkyl acetate esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methyl propionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; ketonate esters such as ethyl pyruvate, and the like; and combinations thereof. Additionally, a solvent such as N-methylformamide, N,N-dimethylformamide, N-methylformanilide, N-methylacetamide, N,N-dimethylacetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like may be also used. The solvents may be used singularly or as a mixture of two or more.

Considering miscibility and reactivity, glycol ethers such as ethylene glycol monoethyl ether, and the like; ethylene glycol alkylether acetates such as ethyl cellosolve acetate, and the like; esters such as 2-hydroxyethyl propionate, and the like; diethylene glycols such as diethylene glycol monomethyl ether, and the like; and/or propylene glycol alkylether acetates such as propylene glycol monomethylether acetate, propylene glycol propylether acetate and the like may be used.

The solvent is used in a balance amount, for example about 60 wt % to about 90 wt % based on the total amount (total weight, 100 wt %) of the photosensitive resin composition for a color filter. In some embodiments, the photosensitive resin composition may include the solvent in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the solvent can be in a range from about any of the foregoing amounts to about any other of the foregoing amounts.

When the solvent is included in an amount within the above range, the photosensitive resin composition for a color filter can have improved processability due to an appropriate viscosity during manufacture of a color filter.

(F) Other Additive(s)

The photosensitive resin composition for a color filter may further include one or more other additives such as but not limited to malonic acid; 3-amino-1,2-propanediol; a coupling agent including a vinyl group or a (meth)acryloxy group; a leveling agent; a fluorine-based surfactant; and/or a radical polymerization initiator, in order to prevent stains or spots during the coating, to adjust leveling, and/or to prevent pattern residue due to non-development.

The amount of the additive may be controlled depending on desired properties.

The coupling agent may be a silane-based coupling agent. Examples of the silane-based coupling agent may include without limitation trimethoxysilyl benzoic acid, γ-methacryl oxypropyl trimethoxysilane, vinyl triacetoxysilane, vinyl trimethoxysilane, γ-iso cyanate propyl triethoxysilane, γ-glycidoxy propyl trimethoxysilane, β-(3,4-epoxycyclohexyl)ethyltrimethoxysilane, and the like. These may be used singularly or in a mixture of two or more.

The silane-based coupling agent may be used in an amount of about 0.01 part by weight to about 1 part by weight based on about 100 parts by weight of the photosensitive resin composition for a color filter.

The photosensitive resin composition for a color filter may further include a fluorine-based surfactant as needed.

Examples of the fluorine-based surfactant may include without limitation F-482, F-484, F-478, F-554, and the like, and combinations thereof, which are commercially available from DIC Co., Ltd.

The fluorine-based surfactant may be included in an amount of about 0.01 wt % to about 1 wt %, for example about 0.01 wt % to about 0.8 wt %, based on the total amount (total weight, 100 wt %) of the photosensitive resin composition. When the fluorine-based surfactant is used in an amount out of the above range, there may be a problem of generating impurities after development.

The photosensitive resin composition according to one embodiment may be an alkali development type capable of being cured by radiating light and being developed with an alkali aqueous solution. When the photosensitive resin composition is laminated on a substrate and radiated by an actinic ray to form a pattern for a color filter, the photosensitive resin composition is reacted by the actinic ray and thus sharply deteriorates solubility a reaction region compared with a non-reaction region. Accordingly, the non-reaction region may be selectively dissolved. In this way, the solution removing a non-exposure region is called a developing solution, and this developing solution is classified into two types such as an organic solvent type and an alkali development type. Since the organic solvent type developing solution can cause atmospheric contamination and can harm the human body, the alkali development type solution may be used in terms of environment. The photosensitive resin composition according to one embodiment uses an alkali development type solution and thus may be usefully used in terms of environment.

Another embodiment provides a color filter manufactured using the above photosensitive resin composition.

An exemplary method of manufacturing the color filter is as follows.

The above photosensitive resin composition can be coated to form an about 0.5 μm to about 10 μm-thick resin composition layer on a glass substrate in an appropriate method such as spin coating, roller coating, spray coating, and the like.

Subsequently, the substrate having the resin composition layer can be radiated by light (exposed to light) to form a pattern required for a color filter. The radiation may be performed by using UV, an electron beam or an X-ray as a light source, and the UV may be radiated, for example, in a region of about 190 nm to about 450 nm, for example about 200 nm to about 400 nm. The radiation may be performed by further using a photoresist mask. After performing the radiation process in this way, the resin composition layer exposed to the light source can be treated with a developing solution. Herein, a non-exposure region in the resin composition layer is dissolved and forms the pattern for a color filter. This process may be repeated as many times as the number of necessary colors, obtaining a color filter having a desired pattern. In addition, when the image pattern obtained through development in the above process is cured by reheating or radiating an actinic ray thereinto, crack resistance, solvent resistance, and the like may be improved.

Hereinafter, the present invention is illustrated in more detail with reference to the following examples. These examples, however, are not in any sense to be interpreted as limiting the scope of the invention.

(Colorant)

Preparation Example 1

A compound represented by the following Chemical Formula 4 and another compound represented by the following Chemical Formula 5 are kneaded with a stirrer in the following composition. After the kneading, the kneaded compounds are dried at room temperature to remove a solvent, manufacturing a colorant.

Compound represented by Chemical Formula 4: 1 g
Compound represented by Chemical Formula 5: 5 g
Solvent (propylene glycolmethylethylacetate, Sigma-Aldrich): 94 ml

[Chemical Formula 4]

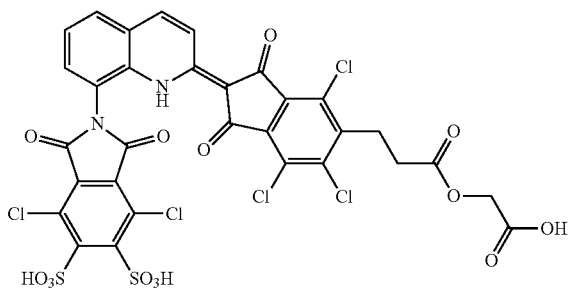

[Chemical Formula 5]

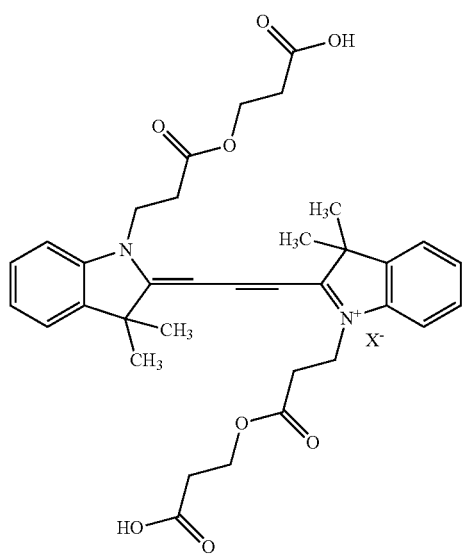

In the above Chemical Formula 5, X⁻ is $C_6F_5B^-$.

Preparation Example 2

A colorant is manufactured in the following composition according to the same method as Preparation Example 1.
Yellow pigment (Pigment Y138): 2 g
Red dye (Pigment R254): 9 g
Dispersing agent (BYK163, BYK): 1.5 g
Acrylic-based binder (100H, SMS): 1.5 g
Solvent (propylene glycolmethylethylacetate, Sigma-Aldrich): 86 ml
(Photosensitive Resin Composition)

Example 1 and Comparative Example 1

The following photopolymerization initiator is dissolved in the following solvent in a composition provided in the following Table 1, and the solution is agitated at room temperature for one hour. The following acrylic-based binder resin and the following acrylic-based photopolymerizable monomer are added thereto in a composition provided in Table 1, and the mixture is agitated at room temperature for one hour. The following fluorine-based surfactant is added thereto in a composition provided in Table 1, and the resulting mixture is agitated at room temperature for one hour. The colorant according to Preparation Example is added thereto in a composition provided in Table 1, the mixture is agitated at room temperature for 2 hours, and the solution is three times filtered to remove impurities, manufacturing each photosensitive resin composition according to Example 1 and Comparative Example 1. The components used to manufacture the photosensitive resin composition are as follows.

(A) Colorant
(A-1) Colorant according to Preparation Example 1
(A-2) Colorant according to Preparation Example 2
(B) Acrylic-based binder resin (polybenzylmethacrylate resin (NPR1520), Miwon Commercial Co., Ltd)
(C) Acrylic-based photopolymerizable monomer (dipentaerythritolhexaacrylate (DPHA), Nippon Kayaku Co. Ltd.)
(D) Photopolymerization initiator (oxime-based compound (CGI-124, BASF))
(E) Solvent (propylene glycolmethylethylacetate, Sigma-Aldrich)
(F) Fluorine-based surfactant (F-554, DIC Co., Ltd.)

TABLE 1

(unit: wt %)

|  |  | Example 1 | Comparative Example 1 |
|---|---|---|---|
| (A) Colorant | (A-1) | 5 | — |
|  | (A-2) | — | 8 |
| (B) Acrylic-based binder resin |  | 4 | 3 |
| (C) Acrylic-based photopolymerizable monomer |  | 11 | 9 |
| (D) Photopolymerization initiator |  | 1.5 | 1.1 |
| (E) Solvent |  | 77.9 | 78.4 |
| (F) Additive (fluorine-based surfactant) |  | 0.6 | 0.5 |
| Total |  | 100.00 | 100.00 |

Evaluation: Spectral Characteristics of Photosensitive Resin Composition

Each photosensitive resin composition according to Example 1 and Comparative Example 1 is coated to be 3.0 µm to 4.0 µm thick on a glass substrate by using a coating equipment (MIKASA Co., Ltd.) and dried on a hot plate at 90° C., obtaining a film. The obtained films are exposed to light with an exposure dose of 100 mJ/cm² and baked under an oven condition of 230° C. for 30 minutes. Transmittance, color coordinate and luminance of the films are measured by using a spectrophotometer (Otsuka Electronics Co., Ltd., MCPD 3000), and the results are provided in the following Table 2.

TABLE 2

|  | Transmittance | Color characteristics (0.240, 0.500) | |
|---|---|---|---|
|  | (540 nm) | Y (luminance) | Contrast ratio |
| Example 1 | 85% | 20.0 | 7500 |
| Comparative Example 1 | 80% | 18.8 | 6800 |

Referring to Table 2, the photosensitive resin composition using the colorant according to one embodiment according to Example 1 exhibits high luminance and contrast ratio and excellent transmittance compared with the photosensitive resin composition according to Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A photosensitive resin composition, comprising:
   (A) a colorant including a compound represented by the following Chemical Formula 1 and Chemical Formula 2;
   (B) an acrylic-based binder resin;
   (C) a photopolymerizable monomer;
   (D) a photopolymerization initiator; and
   (E) a solvent:

[Chemical Formula 1]

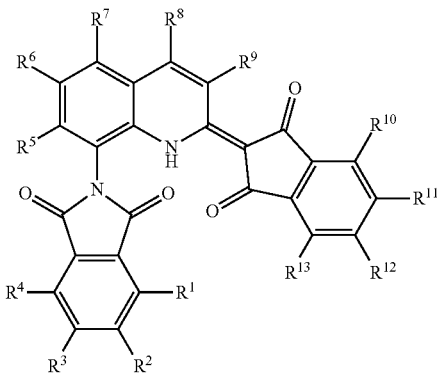

[Chemical Formula 2]

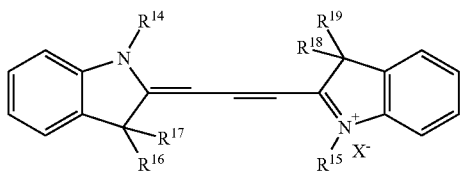

wherein, in the above Chemical Formula 1,
   $R^1$ to $R^{13}$ are the same or different and are each independently hydrogen, halogen, substituted or unsubstituted C1 to C10 alkyl, a sulfonic acid group or an aliphatic organic group including a carboxyl group, with the proviso that at least one or more of $R^{10}$ to $R^{13}$ is an aliphatic organic group including a carboxyl group, and in the above Chemical Formula 2,
   $R^{14}$ to $R^{19}$ are the same or different and are each independently hydrogen, halogen, substituted or unsubstituted C1 to C10 alkyl, a sulfonic acid group or an aliphatic organic group including a carboxyl group, with the proviso that at least one or more of $R^{14}$ and $R^{15}$ is an aliphatic organic group including a carboxyl group, and
   $X^-$ is $CF_3SO_3^-$, $Cl^-$, $C_6F_5B^-$ or $C_6H_5SO_3^-$, and
   wherein the aliphatic organic group including a carboxyl group is represented by the following Chemical Formula 3:

[Chemical Formula 3]

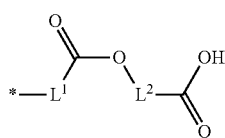

wherein, in the above Chemical Formula 3,
   $L^1$ and $L^2$ are the same or different and are each independently a single bond or substituted or unsubstituted C1 to C10 alkylene.

2. The photosensitive resin composition of claim 1, wherein, in the above Chemical Formula 1,
   two of $R^1$ to $R^4$ are halogen and the remaining two are a sulfonic acid group,
   $R^5$ to $R^9$ are hydrogen, and
   one of $R^{10}$ to $R^{13}$ is an aliphatic organic group including a carboxyl group, and the remaining three are halogen.

3. The photosensitive resin composition of claim 1, wherein, in the above Chemical Formula 2,
   $R^{14}$ to $R^{15}$ are an aliphatic organic group including a carboxyl group, and
   $R^{16}$ to $R^{19}$ are substituted or unsubstituted C1 to C10 alkyl.

4. The photosensitive resin composition of claim 1, wherein the colorant comprises the compound represented by Chemical Formula 1 and the compound represented by Chemical Formula 2 in a weight ratio of about 1:5 to about 1:10.

5. The photosensitive resin composition of claim 1, wherein the photopolymerizable monomer comprises ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy (meth)acrylate, ethylene glycol monomethylether(meth)acrylate, trimethylol propane tri(meth)acrylate, tris(meth)acryloyloxyethyl phosphate, novolacepoxy(meth)acrylate or a combination thereof.

6. The photosensitive resin composition of claim 1, wherein the photosensitive resin composition comprises:
   about 1 wt % to about 10 wt % of the colorant (A);
   about 1 wt % to about 10 wt % of the acrylic-based binder resin (B);
   about 3 wt % to about 13 wt % of the photopolymerizable monomer (C);
   about 0.1 wt % to about 3 wt % of the photopolymerization initiator (D), and
   a balance amount of the solvent (E).

7. The photosensitive resin composition of claim 1, wherein the photosensitive resin composition further comprises malonic acid; 3-amino-1,2-propanediol; a silane-based coupling agent having a vinyl group or a (meth)acryloxy group; a leveling agent; a fluorine-based surfactant; a radical polymerization initiator; or a combination thereof.

8. A color filter using the photosensitive resin composition of claim 1.

* * * * *